(12) United States Patent
Van Den Berg

(10) Patent No.: US 7,690,327 B2
(45) Date of Patent: Apr. 6, 2010

(54) MILKING BOX EXPULSION SYSTEM

(75) Inventor: Karel Van Den Berg, Bleskensgraaf (NL)

(73) Assignee: Maasland N.V., Maassluis (NL)

( * ) Notice: Subject to any disclaimer, the term of this patent is extended or adjusted under 35 U.S.C. 154(b) by 565 days.

(21) Appl. No.: 11/639,180

(22) Filed: Dec. 15, 2006

(65) Prior Publication Data
US 2007/0137578 A1    Jun. 21, 2007

(30) Foreign Application Priority Data
Dec. 15, 2005    (NL) .................................... 1030679

(51) Int. Cl.
*A01J 3/00* (2006.01)
(52) U.S. Cl. ................ 119/14.02; 119/14.08
(58) Field of Classification Search ............. 119/14.01, 119/14.02, 14.08, 14.18
See application file for complete search history.

(56) References Cited
U.S. PATENT DOCUMENTS
5,778,820 A * 7/1998 van der Lely et al. .... 119/14.18

6,427,625 B1 * 8/2002 Schuster .................. 119/14.47
2007/0186859 A1 * 8/2007 Moreau .................... 119/14.03

FOREIGN PATENT DOCUMENTS

| EP | 0562655 | 9/1993 |
|---|---|---|
| EP | 0775438 | 5/1997 |
| EP | 1172029 | 1/2002 |

* cited by examiner

*Primary Examiner*—Kimberly S Smith
(74) *Attorney, Agent, or Firm*—David P. Owen; Coraline J. Haitjema; Howrey LLP

(57) ABSTRACT

A method of milking an animal involves admitting the animal into a milking box and expelling the animal from the milking box, the milking box comprising a connecting device, such as a robot arm, for automatically connecting a teat cup to a teat of the animal. The step of expelling the animal from the milking box is carried out using the robot arm. An installation for milking an animal is also described, the installation being provided with a milking box for the animal; a robot arm for automatically connecting a teat cup to a teat of the animal; and a device for expelling the animal from the milking box. The device for expelling the animal from the milking box comprises part of the robot arm.

18 Claims, 1 Drawing Sheet

MILKING BOX EXPULSION SYSTEM

CROSS REFERENCE TO RELATED APPLICATIONS

This application claims priority from Dutch application number 1,030,679 filed on 15 Dec. 2005, the contents of which are hereby incorporated by reference in their entirety.

BACKGROUND OF THE INVENTION

1. Field of the Invention

The invention relates generally to methods of handling dairy animals and more particularly to methods of automatically milking an animal in a milking box and subsequently expelling the animal.

2. Description of the Related Art

Methods of expelling a dairy animal from a milking box are known, in which an electro-shock device is used to encourage the animal to leave the box should the animal not desire to do so. Such devices are particularly important in robotic milking devices where a farmer may not be present and the animal may otherwise block the milking box for other users. Other devices and methods have been suggested, using movable food troughs to tempt the animal to leave and movable members to exert pressure on the rear of an animal. Although such methods are capable of expelling an animal efficiently from the milking box, for this purpose an extra device is needed, which makes performing the method unnecessarily expensive Thus, there is a particular need for an alternative method by means of which an animal is efficiently expelled from the milking box in a cheap and humane manner.

BRIEF SUMMARY OF THE INVENTION

The present invention addresses these problems by providing a method of milking an animal comprising admitting the animal into a milking box, the milking box comprising a connecting device, for automatically connecting a teat cup to a teat of the animal; and subsequently expelling the animal from the milking box, wherein the expelling of the animal is carried out automatically by the connecting device. The connecting device is preferably mounted on a robot arm. By use of the connecting device in this manner, it means that no extra device for expelling the animal is needed and that the already present connecting device for connecting the teat cup is used. In this way, the method can be performed in a cheaper manner In a preferred embodiment of a method according to the invention, the step of expelling the animal from the milking box comprises moving the connecting device into contact with the animal, for example with the rear end or the abdomen or a leg. It has been found that in most cases, for expelling an animal from the milking box, it is sufficient that the connecting device touches the animal.

When, after its rear end has been touched, the animal does not leave the milking box, it is advantageous if the method further comprises the step of moving the connecting device at least over a particular distance in a longitudinal direction of the milking box. This means that the animal is positively expelled from the milking box.

The step of expelling the animal from the milking box may also comprise the step of touching the leg, preferably sidewardly, by means of the connecting device. Touching the leg, preferably sidewardly, appears to be an extremely effective stimulus for the animal to leave the milking box; touching the leg from other directions has been found to be effective as well. The step of expelling the animal from the milking box may also comprise the step of determining the position of a leg of the animal. Determination of the position of the leg can be carried out by the means (such as a weighing floor with pressure sensors) that are usually provided on (or separately from) the connecting device for detecting the position of the teat for making it possible to connect the teat cup, which means have been adapted to detect the position of a leg.

The step of expelling the animal from the milking box preferably comprises the step of establishing whether the animal has left the milking box and, when it has been established that the animal has not left the milking box, repeating the step of expelling the animal from the milking box a maximum number of times. The maximum number is preferably three.

When it is established that, after the step of expelling the animal from the milking box has been repeated the maximum number of times, the animal has not yet left the milking box, it is advantageous to generate a warning signal. Said warning signal indicates to an operator, for example a farmer, that the animal has not (completely) left the milking box.

The invention also relates to an installation for milking an animal, the installation being provided with a milking box for the animal; a connecting device, such as a robot arm, for automatically connecting a teat cup to a teat of the animal; and a device for expelling the animal from the milking box. Such installations with movable robot arms as connecting devices for connecting teat cups with the aid of position signals from a device for determining the position of a teat of an animal, with means for expelling an animal from a milking box, and with a device for establishing that an animal has left the milking box are known per se, but have the drawback that a separate device is needed for expelling.

The invention provides an alternative, cheaper installation in that the device for expelling the animal from the milking box comprises the connecting device.

The device for expelling the animal from the milking box is preferably suitable for moving the connecting device into contact with the animal.

In a preferred embodiment of an installation according to the invention, the device for expelling the animal from the milking box is suitable for moving the connecting device at least over a particular distance in a longitudinal direction of the milking box after moving the connecting device into contact with the rear end of the animal.

The installation is preferably provided with a device for determining the position of a leg of the animal and for supplying a leg position signal representing said position. The device for expelling the animal from the milking box is advantageously further suitable for touching the leg, preferably sidewardly, by means of the connecting device.

In a preferred embodiment of an installation according to the invention, the device for expelling the animal from the milking box comprises a device for establishing whether the animal has left the milking box, the device for expelling the animal from the milking box being controllable with the aid of information from the establishing device. The establishing device is in particular suitable for supplying a warning signal. The connecting device, in particular at the place of those parts that may come into contact with the animal, is advantageously provided with animal-friendly materials, such as flexible material, cushions, soft material, inflatable means and the like.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
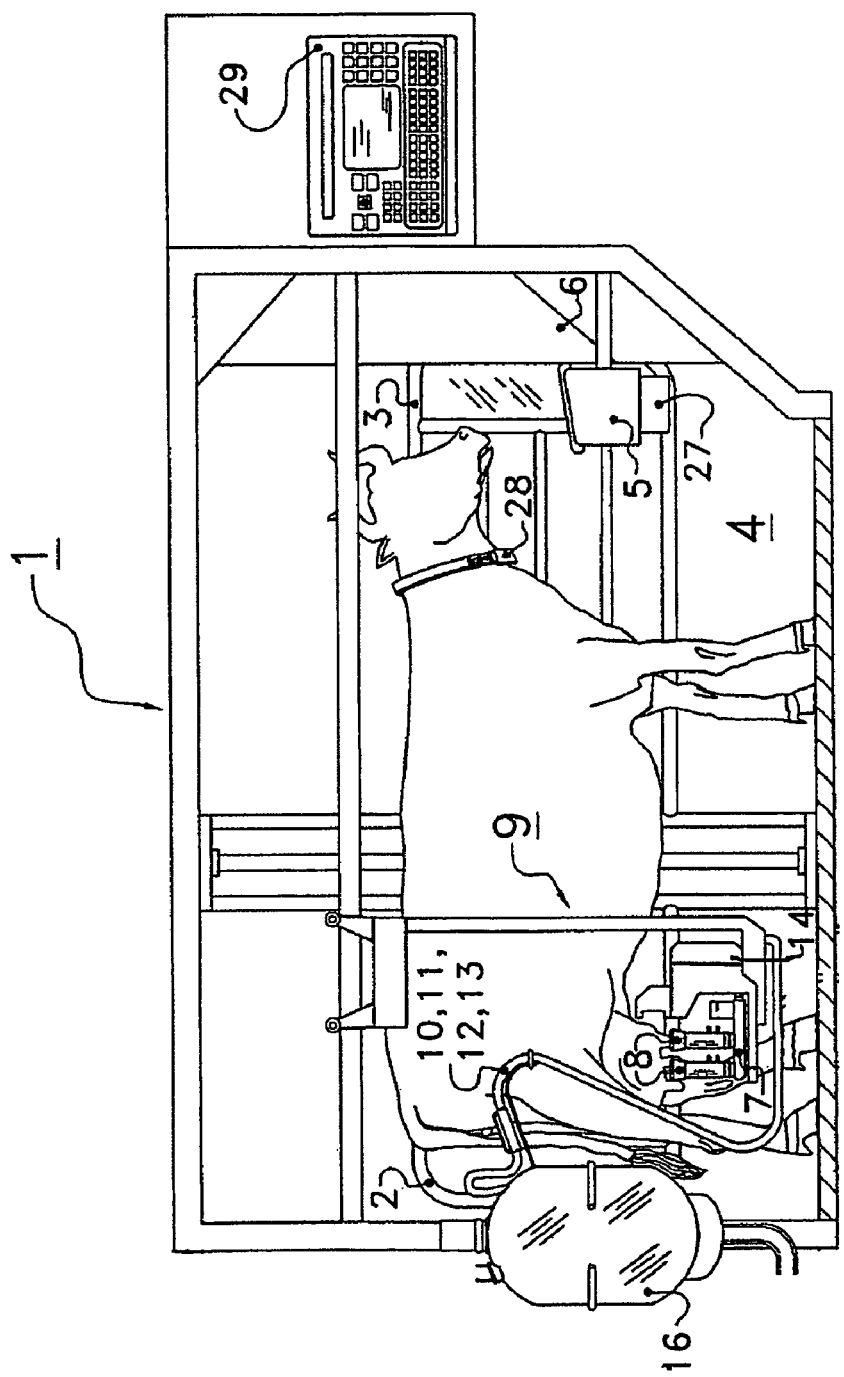
FIG. 1 is a side view of an embodiment of the invention.

The following is a description an embodiments of the invention, given by way of example only and with reference to the drawings.

FIG. 1 is a side view of an installation for automatically milking an animal, in which a device for expelling the animal according to the invention is included. Features of the milking installation that are not directly relevant to the present invention are omitted for the sake of clarity. The installation may be any suitable robotic milking device. Preferred models include the types Astronaut A2 or A3™ as manufactured by Lely International and the model VMS™ as manufactured by DeLaval AB.

The installation comprises a box construction 1 provided with an entrance gate 2 and an exit gate 3 to enable an animal to enter and to leave, respectively, the animal area 4 of the installation. There is provided a feed trough 5 for supplying feed. A feed metering device 6 meters different sorts of feed into the feed trough 5. A teat cup connecting device 7 with four teat cups 8 is fastened to a robot arm 9. The robot arm 9 brings the connecting device 7 to under the animal. A resilient pad 14 is provided on the connecting device 7. Milk drawn per udder quarter is discharged to a collecting vessel 16 by means of a milk line 10, 11, 12, 13 connected to each teat cup 8. The presence of the animal may be detected by a sensor 27, responsive to a transponder 28 identifying the animal. Further sensors (not shown) may be provided to detect the presence and/or position of an animal in or near the box 1. In particular, weight sensors beneath the box may be provided to determine the approximate positions of the animal's legs. Connecting and disconnecting the teat cups 8 to and from, respectively, the teats of the animal takes place automatically under the control of a controller 29.

On completion of the milking procedure, the teat cups 8 are disconnected from the teats and the exit gate 3 is opened. At this point, it is desired that the animal should leave the box construction 1. If this does not occur, the sensor 27 recognizes the fact that the animal is still present and provides a suitable signal to the controller 29. The controller 29 controls the robot arm 9 to contact the rear of the animal with the resilient pad 14. Such contact is usually sufficient to encourage the animal to leave. If this does not occur, the robot arm may continue to move in order to exert an increasing force on the animal. Alternatively, repetitive movements may be made. Although the above has been described in combination with a milking procedure, the invention may also be practiced in cases where the animal is not actually milked. It often occurs that an animal presents itself for milking when it is not eligible to be milked. Such animals may be a nuisance if they cannot be easily removed. Other animals may be admitted to the box for feeding purposes. Nevertheless, the use of the teat cup connecting device 7 mounted on the robot arm 9 to encourage such animals to leave the box is advantageous.

Thus, the invention has been described by reference to certain embodiments discussed above. It will be recognized that many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A method of milking an animal, the method comprising:
   admitting the animal into a milking box, the milking box comprising a connecting device, for automatically connecting a teat cup to a teat of the animal; and
   subsequently expelling the animal from the milking box, wherein the expelling of the animal is carried out automatically by the connecting device.

2. The method as claimed in claim 1, wherein the step of expelling the animal from the milking box comprises moving the connecting device into contact with the animal.

3. The method as claimed in claim 1, wherein the step of expelling the animal from the milking box further comprises moving the connecting device into contact with the rear end of the animal and subsequently moving the connecting device at least over a particular distance in a longitudinal direction of the milking box.

4. The method as claimed in claim 1, wherein the step of expelling the animal from the milking box further comprises touching the leg by means of the connecting device.

5. The method as claimed in claim 4, wherein the step of expelling the animal from the milking box further comprises determining a position of a leg of the animal.

6. The method as claimed claim 1, wherein the step of expelling the animal from the milking box comprises establishing whether the animal has left the milking box and, if it has been established that the animal has not left the milking box, repeating the step of expelling the animal from the milking box up to a maximum number of times.

7. The method as claimed in claim 6, wherein the maximum number is three.

8. The method as claimed in claim 6, wherein, if it is established that the animal has not left the milking box after the step of expelling the animal from the milking box has been repeated the maximum number of times, a warning signal is generated.

9. An installation for milking an animal, the installation comprising:
   a milking box for the animal;
   a connecting device for automatically connecting a teat cup to a teat of the animal; and
   a device for expelling the animal from the milking box, wherein the device for expelling the animal from the milking box comprises at least a portion of the connecting device and is arranged for moving the portion of the connected device into contact with the animal so as to urge the animal out of the milking box.

10. The installation as claimed in claim 9, wherein the device for expelling the animal from the milking box is arranged for moving the connecting device into contact with the rear end of the animal and for subsequently moving the connecting device at least over a particular distance in a longitudinal direction of the milking box.

11. The installation as claimed in claim 9, wherein the installation is provided with a device for determining the position of a leg of the animal and for supplying a leg position signal representing said position.

12. The installation as claimed in claim 11, wherein the device for expelling the animal from the milking box is further arranged for touching the leg by means of the connecting device.

13. The installation as claimed in claim 9, wherein the device for expelling the animal from the milking box comprises a sensor for establishing whether the animal has left the milking box, the device for expelling the animal from the milking box being controllable with the aid of information from the sensor.

14. The installation as claimed in claim 9, wherein the device for expelling the animal comprises resilient material provided on the connecting device.

15. The installation as claimed in claim 9, wherein the connecting device comprises a robot arm carrying a plurality of teat cups.

16. The installation as claimed in claim 15, further comprising a controller arranged for controlling the robot arm to automatically connect the teat cup to a teat on the animal's udder and to move the robot arm into contact with a further part of the animal.

17. The installation as claimed in claim 9, wherein the connecting device comprises a robot arm arranged to individually grip a single teat cup from a holder and apply the teat cup to the teat of the animal.

18. The installation as claimed in claim 17, further comprising a controller arranged for controlling the robot arm to automatically connect the teat cup to a teat on the animal's udder and to move the robot arm into contact with a further part of the animal.

* * * * *